United States Patent
Dusan et al.

(10) Patent No.: US 11,290,599 B1
(45) Date of Patent: Mar. 29, 2022

(54) ACCELEROMETER ECHO SUPPRESSION AND ECHO GATING DURING A VOICE COMMUNICATION SESSION ON A HEADPHONE DEVICE

(71) Applicant: Apple Inc., Cupertino, CA (US)

(72) Inventors: Sorin V. Dusan, San Jose, CA (US); Tony S. Verma, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 1 day.

(21) Appl. No.: 17/028,821

(22) Filed: Sep. 22, 2020

Related U.S. Application Data

(60) Provisional application No. 62/907,128, filed on Sep. 27, 2019.

(51) Int. Cl.
| | |
|---|---|
| *H04M 9/08* | (2006.01) |
| *H04R 1/10* | (2006.01) |
| *H04R 3/04* | (2006.01) |
| *H04R 1/02* | (2006.01) |

(52) U.S. Cl.
CPC ............ *H04M 9/082* (2013.01); *H04M 9/08* (2013.01); *H04R 1/1016* (2013.01); *H04R 1/1083* (2013.01); *H04R 1/028* (2013.01); *H04R 3/04* (2013.01); *H04R 2420/07* (2013.01); *H04R 2460/01* (2013.01)

(58) Field of Classification Search
CPC ...... H04R 5/033; G06F 21/35; H04M 1/6058; H04M 3/002; H04M 9/082; G10K 11/16
USPC ............... 381/71.2, 71.8, 74, 92, 94.7, 93; 379/406.05, 406.01, 430
See application file for complete search history.

(56) References Cited

U.S. PATENT DOCUMENTS

| | | | | |
|---|---|---|---|---|
| 5,590,241 | A * | 12/1996 | Park .................. | G10L 15/20 381/94.7 |
| 9,516,442 | B1 * | 12/2016 | Dusan ................ | H04R 1/222 |
| 2003/0103638 | A1 * | 6/2003 | Boesen ............... | H04R 1/083 381/328 |
| 2006/0069556 | A1 * | 3/2006 | Nadjar .............. | G10K 11/17881 704/229 |
| 2011/0257464 | A1 * | 10/2011 | Kehoe ................ | A61F 5/58 600/23 |
| 2012/0244801 | A1 * | 9/2012 | Lau .................... | H04B 5/0006 455/41.1 |

(Continued)

*Primary Examiner* — Alexander Krzystan
(74) *Attorney, Agent, or Firm* — Womble Bond Dickinson (US) LLP

(57) ABSTRACT

A method performed by a near-end headphone device, while the device is engaged in a voice communication session with a far-end device. The method receives a downlink audio signal from the far-end device and drives a speaker with the downlink audio signal. The method receives an accelerometer signal from an accelerometer of the near-end device and performs echo cancellation and residual echo suppression. The method generates a combined SNR-RES signal based on a SNR of the echo cancelled the accelerometer signal and the residual echo suppression signal. The method determines whether the combined SNR-RES signal is below a threshold. In response to being below the threshold, the method gates the echo cancelled accelerometer signal, generates an uplink audio signal by blending the gated signal with a microphone signal and transmits the uplink audio signal to the far-end device.

22 Claims, 5 Drawing Sheets

(56) References Cited

U.S. PATENT DOCUMENTS

2013/0332156 A1* 12/2013 Tackin .................... G10L 25/78
                                                          704/226
2018/0367882 A1* 12/2018 Watts ................. G10L 21/0208
2020/0408799 A1* 12/2020 Littrell ...................... G01P 1/00

* cited by examiner

ACCELEROMETER ECHO SUPPRESSION AND ECHO GATING DURING A VOICE COMMUNICATION SESSION ON A HEADPHONE DEVICE

CROSS-REFERENCE TO RELATED APPLICATION

This application claims the benefit of and priority to U.S. Provisional Patent Application Ser. No. 62/907,128, filed Sep. 27, 2019, which is hereby incorporated by this reference in its entirety.

FIELD

An aspect of the disclosure relates to performing echo suppression and echo gating upon an accelerometer signal that is produced by an accelerometer in a headphone device during a voice communication session. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones may receive an audio signal, via a wired or wireless connection with a separate playback device, such as an MP3 player, which is used to drive each of the speakers of the devices in order to produce sound (e.g., music). Headphones and earphones provide a convenient method by which the user can individually listen to audio content without having to broadcast the audio content to others who are nearby.

SUMMARY

An aspect of the disclosure is a method performed by an audio system having a near-end headphone (or headset) device that is engaged in a voice communication session with a far-end device, while the near-end headphone device is in the presence of wind or loud noises. The near-end device obtains, from the far-end device a downlink audio signal, via a communication data link, that contains a sound at the far-end device, such as speech of a far-end user. The system drives a speaker of the near-end device with the downlink audio signal in order to output the sound. The device receives an accelerometer signal that is produced by an accelerometer in the near-end device and performs echo suppression upon the accelerometer signal to produce a residual echo suppression signal. For instance, the near-end device may perform acoustic echo cancellation in order to remove linear echo components from the accelerometer signal and may perform residual echo suppression in order to remove non-linear echo components. The device combines the signal-to-noise ratio (SNR) signal of the accelerometer with the residual echo suppression (RES) signal obtained from a residual echo suppressor. In particular, this combined signal may be a summation in decibels (dB) of the SNR signal of an echo cancelled accelerometer signal that is produced after performing the acoustic echo cancellation and the residual echo suppression signal that represents a possible attenuation. The device determines whether the combined SNR-RES signal is below a threshold. If so, the echo cancelled accelerometer signal is gated to produce a gated signal. The system generates an uplink audio signal by blending the gated signal with a microphone signal that is received from a microphone of the near-end headphone device into an uplink audio signal that is transmitted to the far-end device.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Figure 1:
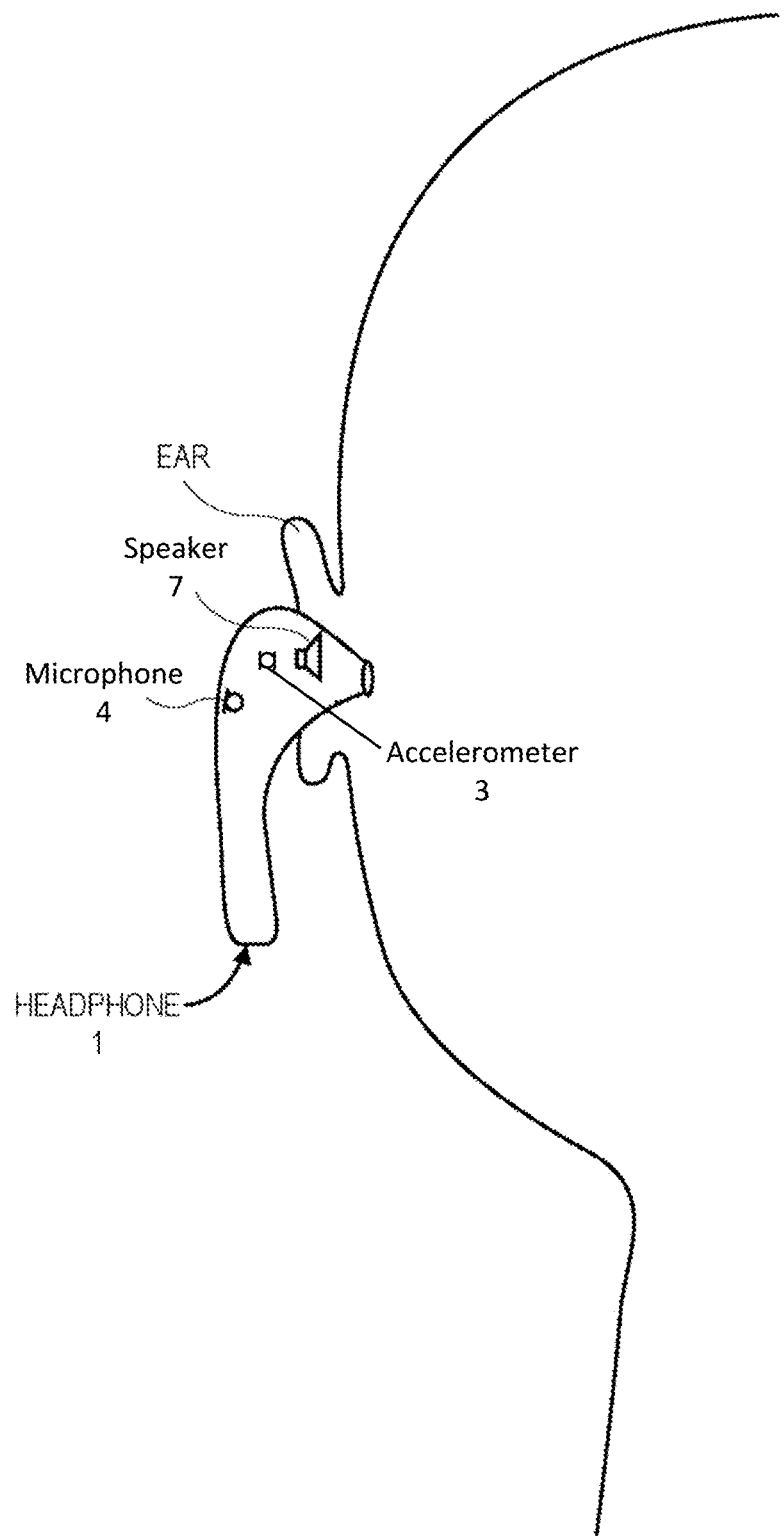
FIG. 1 shows a user wearing a headphone device according to one aspect of the disclosure.

FIG. 1 illustrates a headphone (or headset) 1 being worn by a user (or wearer) that is configured to conduct a voice communication session (such as a phone call). The headphone illustrated in this figure is an in-ear earbud, an in-ear headphone which may be a sealing type that has a flexible ear tip that serves to acoustically seal off the entrance to the user's ear canal from the ambient environment by blocking or occluding in the ear canal (thereby achieving strong passive ambient sound isolation). The headphone 1 may be one of two headphones (left and right) that make up a headset. The methods described herein may be implemented in one or both of the headphones that make up a headset. In one aspect, the headphone 1 may be any electronic device that includes at least one speaker, at least one microphone (which may be external and/or internal), and at least one accelerometer. Alternatives (not shown) to the sealing type in-ear earbud include a closed back, on-the-ear headphone or an over-the-ear headphone that also creates a strong, passive ambient sound barrier.

In one aspect, the headphone may also be any electronic device that is capable of performing networking operations, as described herein. For instance, the headphone may be a wireless electronic device that is configured to establish a wireless connection with a media playback device (not shown), such as a smart phone, a tablet, a laptop, etc., over a wireless computer network, using e.g., BLUETOOTH protocol or a wireless area network. During the established wireless connection, the headset may exchange (e.g., transmit and receive) data packets (e.g., Internet Protocol (IP) packets) with the media playback device. In one aspect, this wireless connection is pairing the headphone with a companion device (e.g., a media playback device or a smartphone) in order to allow the headset to perform at least some operations that may otherwise be performed by the media playback device. For example, as described herein, the user 1 may participate in a handsfree voice communication session (e.g., handsfree phone call) that is initiated by the smartphone, but conducted through the headset. In another aspect, the headphone may be a wired headset. As another example, the electronic device may be a wearable device, such as smart glasses or a smart watch. In another example, rather than being a headphone, the electronic device may be a handheld device, such as a smart phone.

The headphone 1 includes a microphone 4, an accelerometer 3, and the speaker 7. The speaker is arranged and configured to reproduce sound that is represented in an audio signal directly into the ear of the user. The microphone 4 may be an external microphone that is arranged and configured to receive ambient sound directly from the ambient environment. The headphone is configured to acoustically couple the microphone to the ambient environment of the headphone. In one aspect, the headphone may include an internal microphone, which is arranged and configured to directly receive sound reproduced by the speaker 7. In one variation, as integrated in the headphone and worn by its user, the microphone 4 may be more sensitive than an internal microphone (not shown) to a far field sound source outside of the headphone. Viewed another way, as integrated in the headphone and worn by its user, the microphone 4 may be less sensitive than an internal microphone to sound within the user's ear.

As illustrated, the accelerometer 3 is positioned behind the speaker and is configured to detect (or sense) vibrations, which may be generated by the user while speaking, and thus produce an accelerometer signal that represents such speech vibrations. In one aspect, the accelerometer signal may also capture some unwanted movement or vibrations of the diaphragm of the speaker while the speaker is outputting an audio signal (e.g., the downlink audio signal). In one aspect, the number of elements of the headphone 1 may be different and/or may be positioned at different locations about the headset. For instance, the headphone may include two or more microphones, as described herein. The accelerometer may be positioned anywhere on or within the headphone.

Headphone devices, such as headphone 1, provide a user with the capability to individually listen to audio content (e.g., music) or conduct a voice communication session (such as a phone call and/or a video call) without broadcasting sound to others who are within close proximity. To conduct such a voice communication session, the headphone 1 (near-end headphone device or near-end device) may establish a communication link (over a wireless network, such as a cellular network) with a far-end device, such as a smartphone. In one aspect, a companion device may establish the link when paired with the headphone. For the user who is wearing the headphone (the near-end user) to communicate with a far-end user, the microphone 4 captures speech of the near-end user, which is then transmitted as an uplink signal through the communication link to the far-end device, which then outputs the uplink signal through a speaker. Conversely, to hear the far-end user, the near-end device obtains a downlink signal from the far-end device that contains speech of the far-end user (speech that was captured by a microphone of the far-end device). The downlink signal is used to drive a speaker of the near-end device in order to output the speech of the far-end user. The exchanging of uplink and downlink signals continues until the communication session is terminated by one of the users.

Depending on the environment in which the headphone is located, signal processing operations may be performed by the device upon the microphone signal before transmitting the signal (e.g., as the uplink signal) to the far-end device. For instance, an environment with a substantial amount of background noise, such as wind noise may render the near-end user's speech unintelligible by the far-end user. To eliminate wind noise, the headset may automatically (e.g., without user intervention) activate the accelerometer 3, which is less susceptible to wind noise (e.g., at lower frequencies) to produce the accelerometer signal. The headphone may combine portions of the accelerometer signal with a microphone signal (which may include the near-end user's speech) that is produced by microphone 4 of the headphone as the uplink signal. For example, low-frequency portions of the uplink signal may include corresponding portions of the accelerometer signal, while higher frequency portions may include corresponding portions of the microphone signal.

Another issue that may arise during a voice communication session is acoustic echo of the far-end user's speech that is contained within the uplink signal. Specifically, acoustic echo is a phenomenon in which speech of the far-end user that is outputted by the speaker of the headphone is captured by the headphone's microphone and/or accelerometer, and transmitted back to the far-end device. This results in the far-end user hearing a delayed echo, which may be very distracting to the far-end user. To reduce (or eliminate) echo, the headphone may employ signal processing operations such as an acoustic echo cancellation (AEC) algorithm and/or a residual echo suppression (RES) algorithm upon an acoustic microphone signal. The AEC may reduce linear components of echo by estimating the echo from the downlink signal and subtracting the echo from the microphone signal (or the accelerometer signal) that is produced by the near-end device. RES on the other hand may eliminate non-linear components of echo that could not be removed by the AEC by applying a RES attenuation that is determined based on echo statistics that are determined by the AEC.

Figure 2:
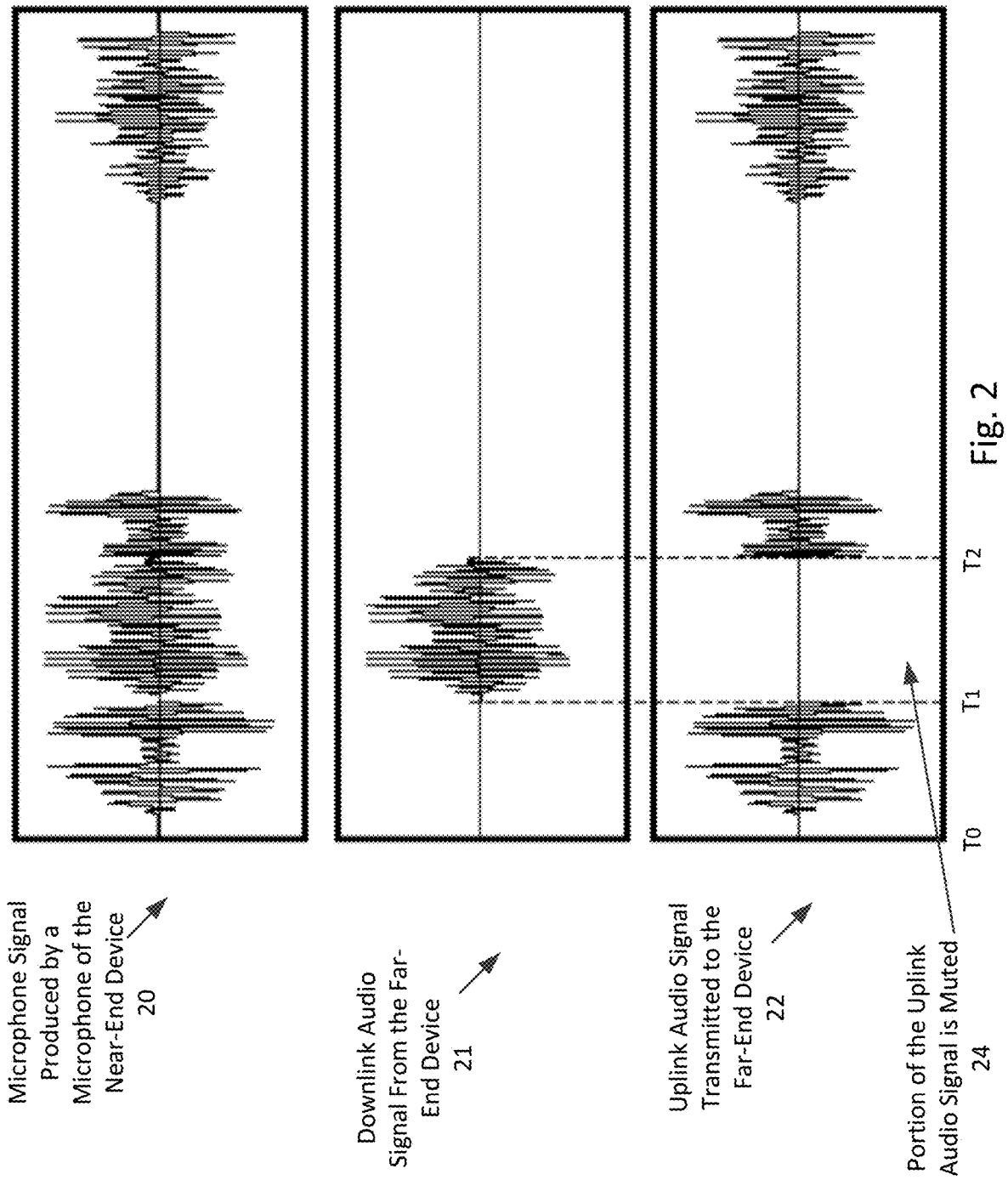
FIG. 2 shows signals that are exchanged between a near-end device and a far-end device during a voice communication session while in the presence of wind according to one aspect.

Although AEC and RES may be effective operations to eliminate echo when applied to acoustic microphone signals, the combination of such operations have conventionally not been applied the accelerometer signal. Specifically, RES may not effectively suppress the far-end user's echo in an accelerometer signal, as opposed to an acoustic microphone signal. This is due to inherent differences (e.g., in phase and magnitude) between acoustic microphone signals and accelerometer signals. As a result, during a phone call in which a far-end user is speaking, while the near-end user is in the presence of wind (which results in the activation of the accelerometer), some conventional audio devices will mute the uplink signal (or a microphone of the device) entirely while the far-end user is speaking (e.g., while speech is detected within the downlink signal) in order to prevent echo. Although this avoids the far-end user hearing echo, this may not be preferable during a voice communication session. For example, during a normal conversation there may be double-talk in which both parties speak at the same time. Muting the uplink signal, however, prevents double-talk, which results in the far-end user hearing only the portions of the near-end user's speech that did not overlap with the far-end user's speech. FIG. 2 illustrates such an example.

FIG. 2 shows signals that are exchanged between a near-end device and a far-end device during a voice communication session while in the presence of wind according to one aspect. Specifically, this figure illustrates the previously-mentioned approach to mute an uplink signal during a phone call, while in the presence of wind and while the far-end user speaks. As illustrated, there are three signals, the first signal is the acoustic microphone signal produced by a microphone a near-end device 20, the second signal is a downlink audio signal that is obtained from a far-end device 21, and the third signal is the uplink audio signal that is transmitted by the near-end device to the far-end device 22. Between $T_0$ and $T_1$, the acoustic microphone signal 20 captures sound at the near-end device (e.g., speech of the near-end user). This speech is included in the uplink audio signal 22. Between $T_1$ and $T_2$, however, there is double-talk in which the near-end user is speaking while the far-end user is speaking. As a result, in order to avoid transmitting echo of the far-end user's speech in the uplink audio signal, a portion of the uplink audio signal 24 that overlaps the downlink audio signal 21 is muted. In one aspect, the acoustic microphone may be muted, and/or the uplink audio signal may be muted. At $T_2$, once the far-end user stops speaking, the uplink audio signal 22 continues to transmit the acoustic microphone signal 20 as the uplink audio signal. Although effective at preventing echo in the uplink audio signal, such a method may be distracting to the far-end user.

To overcome these deficiencies, the present disclosure describes a near-end headphone device that performs echo suppression and echo gating upon an accelerometer signal. Such a method removes a significant amount of echo from the uplink signal, without having to mute the entire uplink signal (or the microphone signal) during times at which the far-end user is speaking. Specifically, while engaged in a voice communication session (e.g., phone call) with a far-end device (e.g., a smart phone), the headphone obtains a downlink audio signal that contains a sound at the far-end device, such as speech of a far-end user. The headphone drives the speaker 7 with the downlink audio signal to output the speech of the far-end user.

As described herein, while in the presence of wind noise (or loud noises) the near-end device may activate the accelerometer 3 in order to blend an accelerometer signal produced by the accelerometer with an acoustic microphone signal that is produced by microphone 4. The headphone performs echo suppression (which may include applying a linear echo canceller and/or a residual echo suppressor) upon an accelerometer signal to produce a residual echo suppression signal. The headphone estimates a combined signal-to-noise ratio (SNR) and residual echo suppression (RES) signal that is based on the accelerometer signal. For example, the combined SNR-RES signal may be a summation in decibels (dB) of the residual echo suppression signal which is an attenuation determined by the residual echo suppressor and a SNR signal from the accelerometer signal after the application of the linear echo canceller.

The headphone determines whether the combined SNR-RES signal is below a threshold. If so, the headphone gates an echo cancelled accelerometer signal (which is produced after applying the linear echo canceller) to produce a gated signal and generates an uplink audio signal for transmission by blending the gated signal with the acoustic microphone signal. As a result, the headphone accurately suppresses echo within the uplink signal, without having to gate the entire signal. As used herein, "gating" refers to the application of any amount of attenuation or muting to a signal. For example, the echo cancelled accelerometer signal may be gated by multiplying this signal with either zero or the residual echo suppression signal, which may have a value less than unity in linear domain corresponding to a negative value in decibels (dB).

Figure 3:
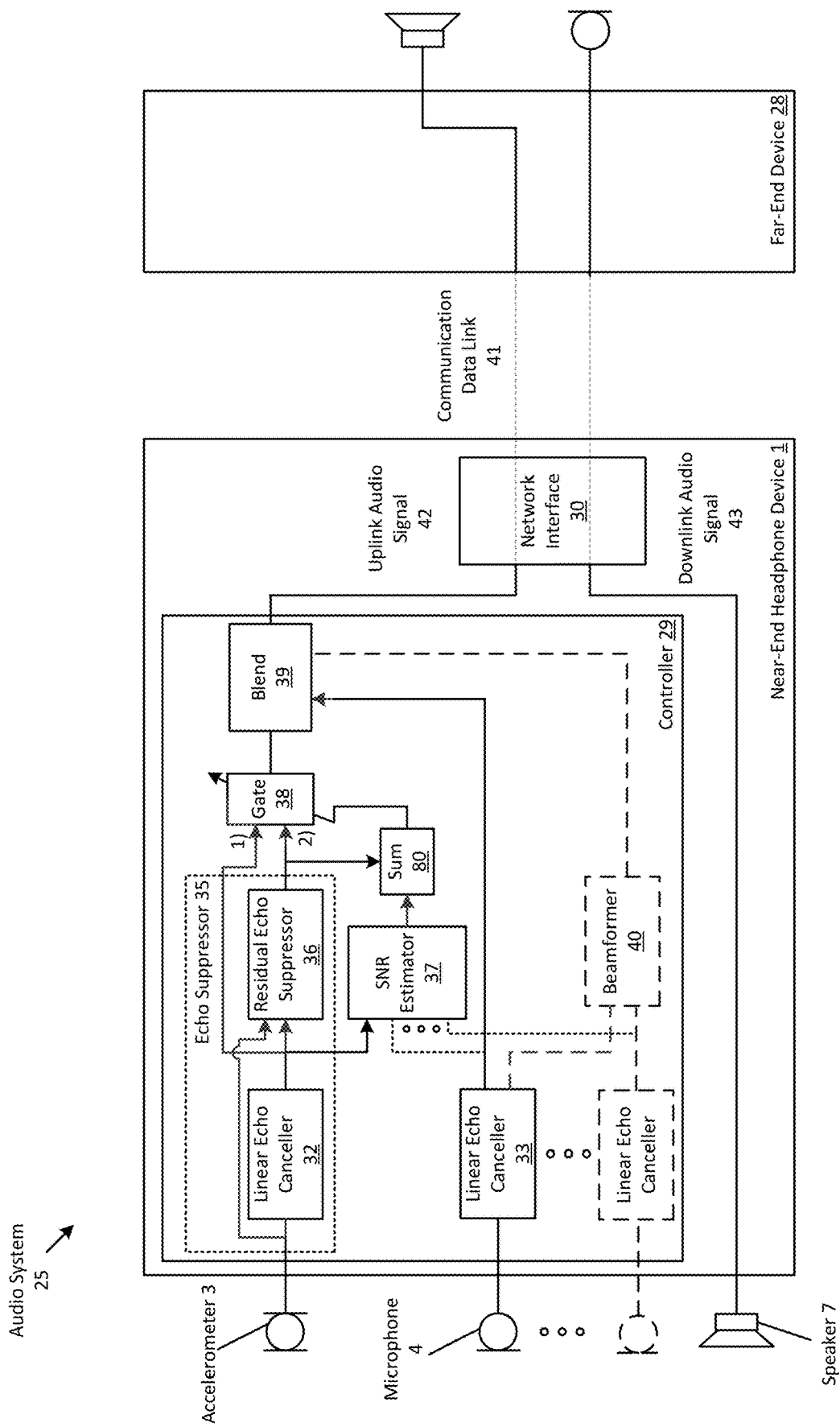
FIG. 3 is a block diagram of an audio system that performs accelerometer echo suppression during a voice communication session according to one aspect.

FIG. 3 shows a block diagram of an audio system 25 that includes the near-end headphone (or headset) device 1 and a far-end device 28. The headphone 1 includes the accelerometer 3, the microphone 4, the speaker 7, a controller 29, and a network interface 30. In one aspect, the headphone may include more or less elements (or components) as described herein. For instance, the headphone may include two or more speakers, two or more (external) microphones, and/or a display screen that is configured to display image data.

The far-end device 28 includes a speaker and a microphone. In one aspect, the far-end device may be a similar device as the headphone 1, and therefore include at least some of the elements of headphone 1 (e.g., a controller, etc.). In another aspect, the far-end device may be any electronic device that is capable of conducting a voice communication session, such as a smart phone, a laptop, or a desktop.

As described herein, headphone 1 may be a wireless electronic device that is configured to establish a wireless communication data link via the network interface 30 with another electronic device, such as the far-end device 28, over a wireless computer network (e.g., a wireless personal area network (WPAN)) using e.g., BLUETOOTH protocol or a WLAN in order to exchange data. In one aspect, the network interface 30 is configured to establish a wireless communication data link with a wireless access point in order to exchange data with a remote electronic server (e.g., over the Internet). In another aspect, the network interface 30 may be configured to establish a communication data link via a mobile voice/data network that employs any type of wireless telecom protocol (e.g., a 4G Long Term Evolution (LTE) network).

In one aspect, the audio system 25 may include a separate (e.g., companion) device, such as a smart phone or laptop, with which the headphone 1 establishes a (e.g., wired and/or wireless) connection in order to pair both devices together, as described herein. In one aspect, the (e.g., programmed processor of the) companion device may perform one or more of the operations described herein, such as accelerometer echo suppression and/or echo gating operations. For instance, the companion device may obtain a downlink audio signal 43 from the far-end device 28, obtain an accelerometer signal from the accelerometer 3 of the headphone 1, and obtain an acoustic microphone signal produced by the microphone 4, and perform accelerometer echo suppression and/or echo gating operations, as described herein. In another aspect, at least some of the elements of the headphone 1 may be a part of the companion device (or another electronic device) within the system, such as the speaker 7 and/or microphone 4.

As described herein, the microphone may be any type of microphone (e.g., a differential pressure gradient micro-electro-mechanical system (MEMS) microphone) that is configured to convert acoustical energy caused by sound wave propagating in an acoustic environment (e.g., speech of the user who is wearing the headphone 1) into an input microphone signal. The speaker 7 may be an electrodynamic driver that may be specifically designed for sound output at certain frequency bands, such as a woofer, tweeter, or midrange driver, for example. In one aspect, either speaker may be a "full-range" (or "full-band") electrodynamic driver that reproduces as much of an audible frequency range as possible.

The controller 29 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform accelerometer echo suppression and echo gating operations and networking operations. In one aspect, although illustrated as being separate, (a portion of) the network interface 30 may be a part of the controller 29. More about how the controller 29 performs these operations is described herein.

The controller 29 includes several operational blocks, which include an echo suppressor 35, at least one linear echo canceller 33, a signal-to-noise ratio (SNR) estimator 37, a gate 38, a blend 39, and a sum 80. As described herein, the headphone 1 may include only one microphone, or include two or more microphones. In this case, the controller may optionally include an additional linear echo canceller for each microphone and a beamformer 40. More about these operational blocks is described herein.

The operations performed by each of the blocks of the audio system 25 will now be described. The headphone may perform accelerometer echo suppression and/or echo gating while engaged in a phone call with the far-end device 28. Thus, the headphone 1 is configured to establish (via the network interface 30) a communication data link 41 (via a network such as a mobile voice/data network) with the far-end device 28, as described herein. Once established, the far-end device 28 transmits, via the link, a downlink audio signal 43 that includes sound captured by one or more microphones of the device 28, such as speech of the far-end user. The headphone uses the downlink audio signal to drive the speaker 7.

The echo suppressor 35 is configured to obtain an accelerometer signal that is produced by the accelerometer 3 and configured to echo suppress the accelerometer signal by performing an acoustic echo cancellation (AEC) algorithm and/or a residual echo suppression (RES) algorithm upon the accelerometer signal to produce an echo cancelled accelerometer signal (output "1") and/or a residual echo suppression signal (output "2"). The suppressor 35 includes a linear echo canceller 32 and a residual echo suppressor 36. The linear echo canceller 32 is configured to perform linear acoustic echo cancellation upon the accelerometer signal to produce an echo cancelled (or linear echo cancelled) accelerometer signal. Specifically, the canceller 32 determines a linear filter based on a transmission path between the accelerometer 3 and the speaker 7, and applies the filter to the downlink audio signal 43 to generate an estimate of echo, which is subtracted from the accelerometer signal. The residual echo suppressor 36 is configured to generate a residual echo suppression or non-linear echo suppression signal or attenuation to be applied upon the echo cancelled accelerometer signal inside of the gate. In particular, the residual echo suppressor 36 may determine a non-linear filter based upon an estimate residual echo between the input and output of the linear echo canceller 32 (e.g., the accelerometer signal and the echo cancelled accelerometer signal) and/or may use echo statistics from acoustic microphone signal produced by the microphone 4. The suppressor 36 applies the filter upon the echo cancelled accelerometer signal to produce (an estimate of) a residual echo suppression signal or attenuation as output 2. In one aspect, the canceller 32 and/or residual echo suppressor 36 may use any method to produce the echo suppressed accelerometer signal.

Similar operations may be performed upon acoustic microphone signals that are produced by one or more microphones of the near-end headphone device. For instance, the linear-echo canceller 33 is configured to obtain an acoustic microphone signal from microphone 4 and perform linear acoustic echo cancellation upon the acoustic microphone signal to produce an echo cancelled acoustic microphone signal. In one aspect, the canceller 33 may apply similar or different operations as canceller 32 in order to cancel linear echo from the microphone signal. In one aspect, there may be a residual echo suppressor in series with the canceller 33 that is configured to perform residual echo suppression operations upon the echo cancelled acoustic microphone signal, as described with respect to the accelerometer signal.

The SNR estimator 37 is configured to estimate the signal-to-noise ratio of the accelerometer signal. In particular, the SNR estimator 37 estimates a SNR signal from the echo cancelled accelerometer signal as representative of the echo cancelled accelerometer signal, over time. For example, the estimator may monitor energy of the signal within certain time intervals (e.g., twenty milliseconds) when speech is detected and monitor energy when speech is not present (e.g., when noise is present). The estimator 37 subtracts the noise energy from the speech energy to determine the SNR signal (e.g., in dB with respect to time). Optionally, the estimator 37 may obtain echo cancelled acoustic microphone signals from linear echo cancellers (e.g., canceller 33) to estimate the SNR. For example, the estimator 37 may determine a SNR signal from each signal (e.g., acoustic microphone signal and/or accelerometer signal) and estimate the SNR signal based on both determined SNR signals (e.g., by combining both signals, by averaging both signals, etc.). As another example, the estimator 37 may combine both echo cancelled signals (microphone signals and/or accelerometer signal) and estimate the SNR signal based on the combined signal.

The controller 29 uses the sum 80 (and the SNR estimator 37) to generate (or produce) a combined SNR-RES signal based on the accelerometer signal (or echo cancelled accelerometer signal) and the residual echo suppression signal. For instance, the sum 80 is configured to sum in decibels the residual echo suppression signal that is produced by the echo suppressor 35 and the estimated SNR signal to generate a combined SNR-RES signal. For example, the sum 80 may sum (or add) in decibels the SNR signal with the residual echo suppression signal.

The gate 38 is configured to gate the echo cancelled accelerometer signal (output 1) based on the combined SNR-RES signal. Specifically, the gate 38 determines whether the combined SNR-RES signal is below a threshold (e.g., a threshold magnitude). In one aspect, the threshold may be a value between −20 dB and −50 dB. If the combined SNR-RES signal is below the threshold (e.g., the signal drops below −20 dB), the gate gates the echo cancelled accelerometer signal to produce a gated signal. For instance, the gate may attenuate the signal by a particular value, or may fully attenuate the signal (where the signal is similar to a muted audio signal). As another example, the echo cancelled accelerometer signal may be attenuated by the residual echo suppression signal, such that the echo cancelled accelerometer signal is suppressed by a number of dB equal to the residual echo suppression estimated by the RES 36. In one aspect, the gate may attenuate particular frequency bins of the echo cancelled accelerometer signal. For example, the gate may attenuate frequency bins below a frequency threshold such as 2000 Hz or 1000 Hz. Otherwise, if the gate determines that the summed acoustic signal is at or above the threshold, the gate allows the echo cancelled accelerometer signal to pass through.

The blend 39 is configured to generate an uplink audio 42 signal by blending (or combining) the accelerometer signal with one or more microphone signals. Specifically, when the combined SNR-RES signal is below the threshold, the gated signal is blended with the echo cancelled acoustic microphone signal that is obtained from the linear canceller 33 into the uplink audio signal. When, however, the combined SNR-RES signal is at or above the threshold, the echo cancelled accelerometer signal (produced by the linear echo canceller 32) is blended with the echo cancelled acoustic microphone signal. In one aspect, blending signals includes adding frequency bins from at least one of the two signals into the uplink signal. For example, the uplink signal may be broken up into several frequency bins, each including spectral content for a given frequency range (e.g., a bin for every 100 Hz). Thus, for each frequency bin of the uplink signal, a corresponding frequency bin from at least one of the gated signal and the echo cancelled acoustic microphone signal is added.

In one aspect, blending may be performed up to a frequency threshold. For instance, for each of (a first several) frequency bins below the frequency threshold, a corresponding frequency bin from at least one of the gated signal (or echo cancelled accelerometer signal) and the echo cancelled acoustic microphone signal is added into the uplink signal. In one aspect, all of the added corresponding frequency bins below the threshold are from the gated signal (or the echo cancelled accelerometer signal). In another aspect, the blend 39 determines which signal is to be added based on a SNR of the echo cancelled acoustic microphone signal. For instance, if the SNR of the microphone signal is high (meaning the signal may include speech of the near-end user), the echo cancelled acoustic microphone signal is added into the uplink audio signal. Above the frequency threshold, however, for each of (a second several) frequency bins, a corresponding frequency bin of the echo cancelled acoustic microphone signal is added into the uplink signal. In one aspect, the frequency threshold is a frequency between 500 Hz and 2500 Hz, such as 1000 Hz.

As described herein, the near-end headphone device 1 may include two or more microphones that are configured to produce acoustic microphone signals. In this case, the controller 29 includes a beamformer 40 that is configured to process the acoustic microphone signals to form at least one directional beam pattern in a particular direction so as to be more sensitive to a sound source in the environment. In this case, the beamformer 40 obtains two or more echo cancelled acoustic microphone signals from each of two or more microphones of the device 1, and produces the beam pattern by applying beamforming weights (or weight vectors) upon the signals. As a result, the beamformer produces at least one sound pickup output beamformer audio signal that includes the directional beam pattern that is aimed towards the sound source. Thus, rather than (or in addition to) blending the echo cancelled acoustic microphone signal, the beamformer audio signal may be blended with the gated signal (or the echo suppressed accelerometer signal) into the uplink audio signal 42.

Figure 4:
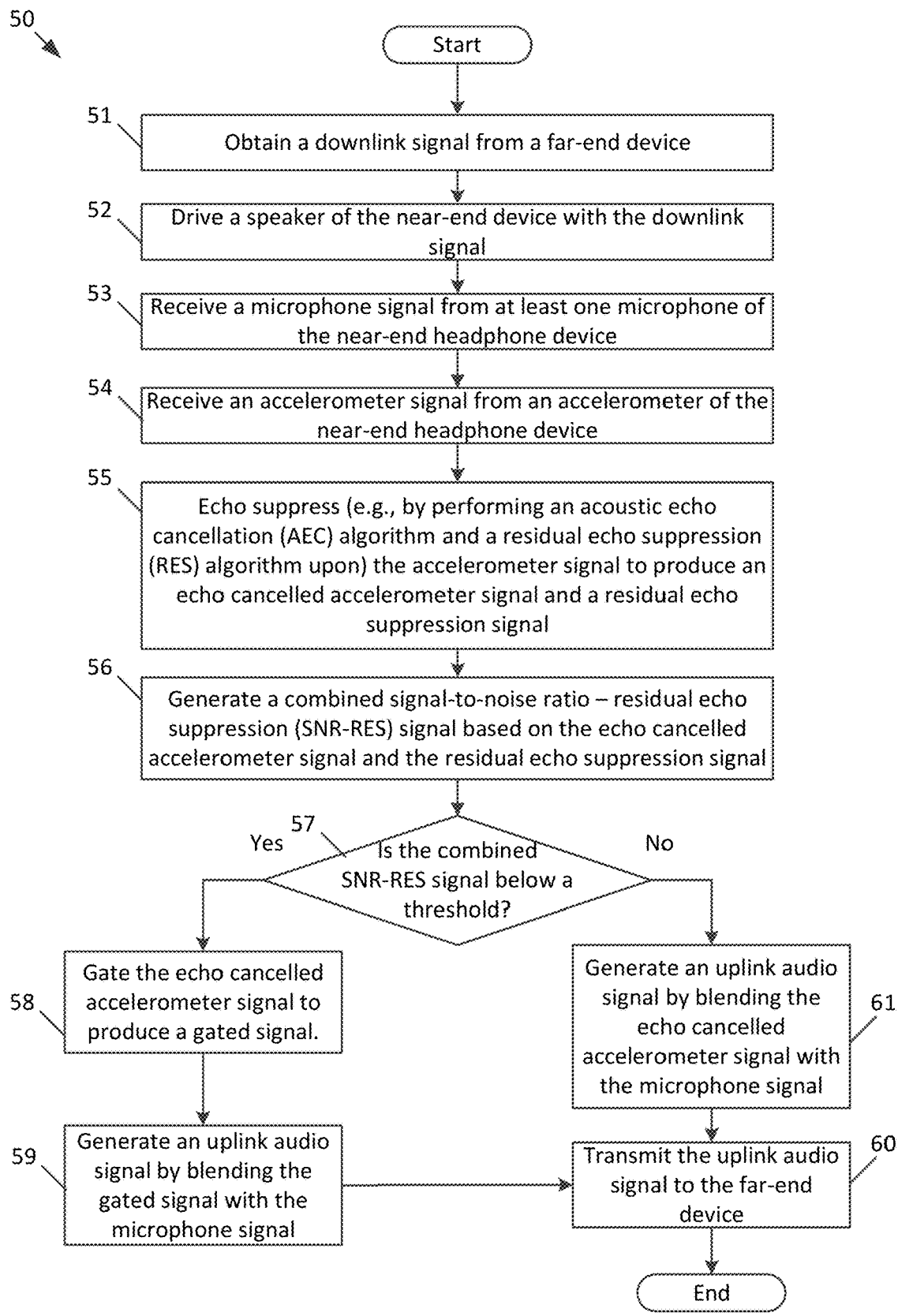
FIG. 4 is a flowchart of one aspect of a process to perform accelerometer echo suppression.

FIG. 4 is a flowchart of one aspect of a process 50 to perform accelerometer echo suppression and echo gating. In one aspect, at least a portion of the process 50 may be performed by the (e.g., controller 29 of the) near-end headphone device 1 and/or a (programmed processor of a) companion device that may be paired with the headphone device. This figure will be described with reference to FIG. 3. In one aspect, at least some of the process 50 may be performed while the near-end device is engaged in a voice communication with a far-end device. Thus, if not already engaged, the process may optionally begin by establishing a voice communication session (e.g., phone call) with the far-end device 28. Otherwise, the process 50 begins by obtaining a downlink signal that contains a sound at the far-end device, such as speech of the far-end user (at block 51). The process 50 drives a speaker (e.g., speaker 7) of the near-end device with the downlink signal (at block 52). The process 50 receives a microphone signal from at least one microphone of the near-end device (at block 53). In one aspect, the near-end device may perform acoustic echo cancellation upon the microphone signal to produce an echo cancelled microphone signal. In another aspect, the process 50 may perform beamforming operations upon two or more microphone signals (or echo cancelled microphone signals) to produce at least one beamformer audio signal.

The process 50 receives an accelerometer signal that is produced by an accelerometer of the near-end device (at block 54). The process 50 echo suppresses (by performing the AEC algorithm and the RES algorithm upon) the accelerometer signal to produce an echo cancelled accelerometer signal and the residual echo suppression signal (at block 55). The echo suppressor 35 serially applies the linear echo canceller 32 and the residual echo suppressor 36 upon the accelerometer signal. The process 50 generates a combined SNR-RES signal based on the residual echo suppression signal and the echo cancelled accelerometer signal (at block 56). For instance, the controller 29 generates the combined SNR-RES signal by summing a SNR signal from the accelerometer signal (or the echo cancelled accelerometer signal) with the residual echo suppression signal. In one aspect, the SNR-RES signal is a summation in logarithmic domain of the SNR of the echo cancelled accelerometer signal and the residual echo suppression signal. The process 50 determines whether the combined SNR-RES signal is below a threshold (at decision block 57). If so, the process 50 gates the echo cancelled accelerometer signal to produce a gated signal (at block 58). The process 50 generates an uplink audio signal by blending the gated signal with the microphone signal (or beamformer audio signal) (at block 59). The process 50 transmits the uplink audio signal to the far-end device (at block 60).

If, however, the combined SNR-RES signal is not below the threshold then the process 50 generates an uplink audio signal by blending the echo suppressed accelerometer signal with the microphone signal (or the beamformer audio signal) (at block 61). The process 50 then transmits the uplink audio signal to the far-end device (at block 60).

Some aspects may perform variations to the processes described herein. For example, the specific operations of at least some of the processes may not be performed in the exact order shown and described. The specific operations may not be performed in one continuous series of operations and different specific operations may be performed in different aspects. In one aspect, at least some of the operations described herein are operational operations that may or may not be performed. For example, at least some of the operations described herein may be performed in response to a detection of the presence of wind and/or loud noises (e.g., sounds that are above a threshold) by the near-end device. For instance, the near-end device may determine whether the presence of wind is detected proximate to the near-end headphone device. Specifically, the controller 29 may monitor the microphone signal produced by the microphone 4 to detect whether wind is present. For example, the controller 29 may determine whether the microphone signal has a significant amount of low-frequency content (e.g., above a threshold. If so, it may be determined that wind is present. In another aspect, when the near-end device has two or more microphones, the controller may detect wind based on whether the cross-correlation between at least two microphone signals is below a threshold. In another aspect, the controller may use any method to detect the presence of wind. In one aspect, the controller may determine whether there is a loud noise by determining the sound pressure level (SPL) of the ambient environment based on at least one microphone signal. The controller may compare the SPL to a threshold and if the SPL is above the threshold, the near-end device may be in the presence of a loud noise. If wind (and/or loud noise) is detected, the near-end device may activate (if not already active) the accelerometer in order to receive an accelerometer signal. In addition, in response to detecting wind and/or loud noises, the near-end device may perform the operations describe in blocks 54 through 57. In another aspect, otherwise if wind is not detected, the near-end device may not perform at least some of these operations, but instead generate an uplink audio signal that includes the microphone signal for transmission to the far-end device.

In another variation, instead of not gating at all at block 61 when the combined SNR-RES signal is above the threshold, a small suppression may be applied to the echo cancelled accelerometer signal. For instance, the small suppression may be computed as a fraction (e.g., 30%, 40%, etc.) of the difference between 0 dB and the combined SNR-RES signal (when above the threshold). As a result, this variation may allow double-talk segments to be attenuated slightly so that the voice of the near-end user is not totally gated by the presence of (e.g., speech in) a far-end signal.

In one aspect, at least some of the operations performed in process 50 may be performed (at least partially) contemporaneously within one another. For instance, the accelerometer may produce the accelerometer signal, while (or before) the downlink audio signal is driving the speaker of the near-end device.

Figure 5:
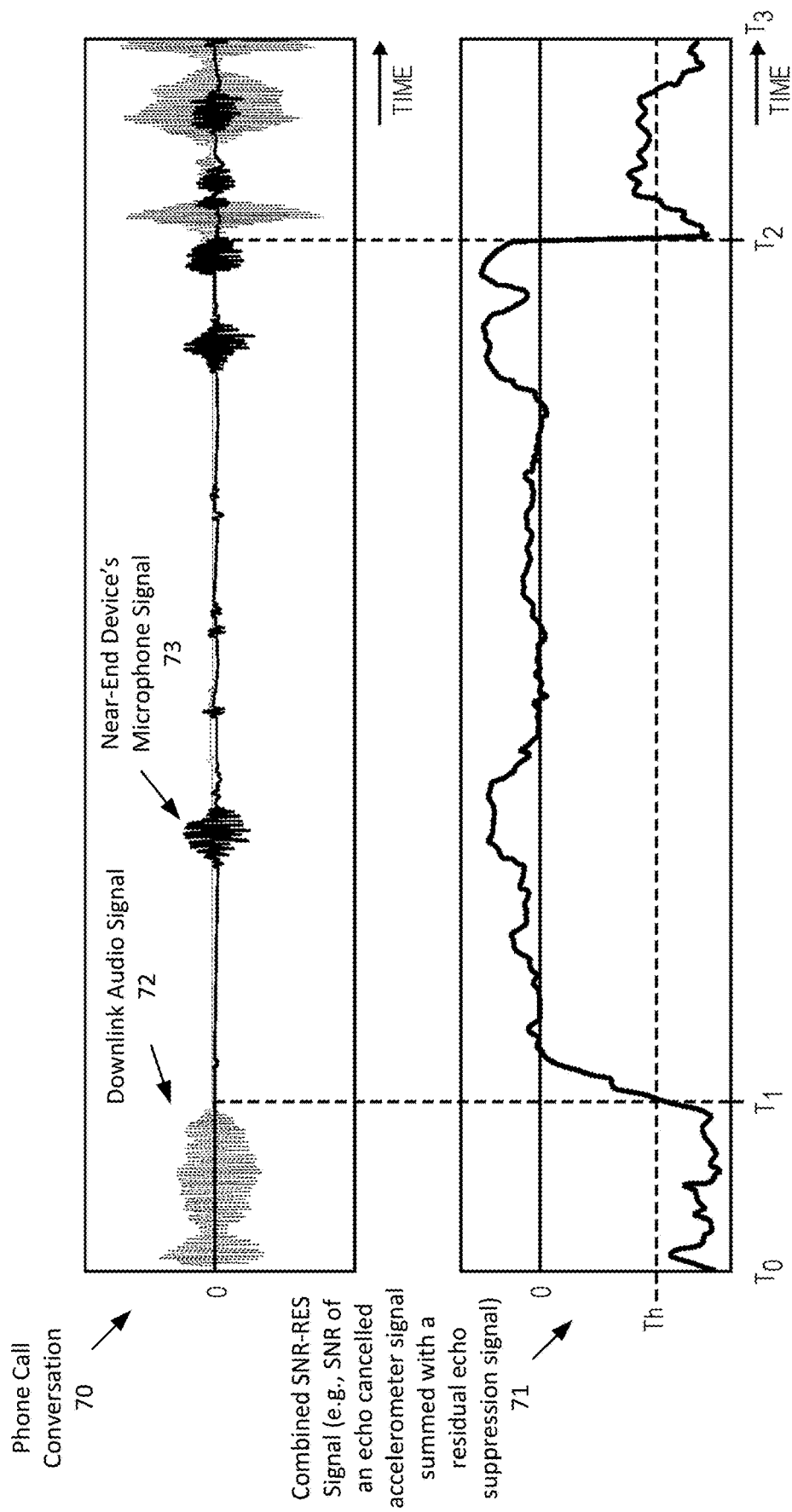
FIG. 5 shows signals that are exchanged between the near-end headphone device and a far-end device during a voice communication session and a corresponding SNR signal according to one aspect.

FIG. 5 shows signals that are exchanged between the near-end device 1 and the far-end device 28 during a voice communication session and a corresponding combined SNR-RES signal according to one aspect. Specifically, this figure illustrates a conversation 70 during a phone call (in which wind is present), which is illustrated by a downlink audio signal 72 and a near-end device's acoustic microphone signal 73. Also shown is a combined SNR-RES signal 71 that is produced during the conversation.

As shown, between $T_0$ and $T_1$ the downlink audio signal 72 includes sound, such as speech of the far-end user. During this period the combined SNR-RES signal 71 is below the threshold (Th) and, as a result the near-end device may gate the echo cancelled accelerometer signal to produce the gated acoustic signal, which is blended into the uplink audio signal. Also, during this period there is no (or very little) sound that is captured by the microphone of the near-end device, which may indicate that the near-end user is not speaking. In one aspect, since the near-end user is not speaking, rather than gating the echo cancelled accelerometer signal, the near-end device may gate the uplink audio signal. Specifically, the near-end device may determine whether the acoustic microphone signal 73 includes speech. If not, the uplink audio signal may be gated, as described herein.

At $T_1$, the far-end user stops talking, as indicated by the amplitude of the downlink audio signal 72 settling at zero. As a result, the combined SNR-RES signal 71 increases. At this point, the uplink audio signal that is transmitted to the far-end device may include the echo cancelled accelerometer signal and at least one microphone signal blended together. Between $T_1$ and $T_2$, the downlink audio signal 72 includes little speech, while the microphone signal 73 includes some speech of the near-end user. At $T_2$, the far-end user begins to speak again, which results in the combined SNR-RES signal 71 dropping below Th for a short interval of time. Then, soon after $T_2$ and before $T_3$ both the downlink audio signal 72 and the microphone signal 73 includes speech of respective users, which indicates that there is double-talk. In this interval, since the combined SNR-RES is above the threshold TH, the echo cancelled accelerometer signal is not gated until closer to $T_3$, when the near-end speech ends. Unlike conventional audio devices that would gate/suppress the uplink audio signal, the present case transmits a blended echo cancelled accelerometer signal with the (echo cancelled) microphone signal 73, thereby permitting double-talk during a phone conversation in which there is wind present at the near-end device.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the network operations, signal processing operations, and accelerometer echo suppression and/or echo gating operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a processor of a near-end headphone device, the method comprising:
   obtaining, from a far-end device, a downlink audio signal;
   driving a speaker of the near-end headphone device with the downlink audio signal;
   receiving a microphone signal from at least one microphone of the near-end headphone device;
   receiving an accelerometer signal from an accelerometer of the near-end headphone device;
   echo cancelling the accelerometer signal;
   residual echo suppressing the echo cancelled accelerometer signal;
   generating a combined signal-to-noise ratio-residual echo suppression (SNR-RES) signal based on a SNR of the echo cancelled accelerometer signal and the residual echo suppression signal;
   determining whether the combined SNR-RES signal is below a threshold; and
   in response to determining that the combined SNR-RES signal is below the threshold,
      gating the echo cancelled accelerometer signal;
      generating an uplink audio signal by blending the gated signal with the microphone signal; and
      transmitting the uplink audio signal to the far-end device.

2. The method of claim 1, wherein gating the echo cancelled accelerometer signal comprises multiplying the echo cancelled accelerometer signal with the residual echo suppression signal.

3. The method of claim 1 further comprising:
   performing acoustic echo cancellation upon the microphone signal to produce an echo cancelled microphone signal,
   wherein blending comprises blending the gated signal with the echo cancelled microphone signal into the uplink audio signal.

4. The method of claim 3, wherein generating the combined SNR-RES signal comprises
   determining 1) a first SNR signal from the echo cancelled accelerometer signal and 2) a second SNR signal from the echo cancelled microphone signal;
   determining an estimated SNR signal based on the first and second SNR signals; and
   summing the estimated SNR signal and the residual echo suppression signal.

5. The method of claim 3, wherein blending the gated signal with the echo cancelled microphone signal comprises
   adding, for each of a first plurality of frequency bins below a frequency threshold, a corresponding frequency bin from at least one of the gated signal and the echo cancelled microphone signal into the uplink signal; and
   adding, for each of a second plurality of frequency bins above the frequency threshold, corresponding frequency bins of the echo cancelled microphone signal into the uplink signal.

6. The method of claim 1, wherein the microphone signal is either a microphone signal that is produced by a microphone of the near-end headphone device or a beamformer audio signal that is based on two or more microphones signals that are produced by two or more microphones of the near-end headphone device.

7. The method of claim 1, wherein the sound is speech of a far-end user of the far-end device, wherein the microphone signal contains speech of a near-end user of the near-end headphone device.

8. The method of claim 1 further comprising determining whether a presence of wind is detected proximate to the near-end headphone device, wherein the operations of receiving the accelerometer signal, echo cancelling the accelerometer signal, residual echo suppressing, generating the combined SNR-RES signal, and determining whether the combined SNR-RES signal is below the threshold are in response to a detection of the presence of wind.

9. A near-end headphone device comprising:
   a speaker;
   an accelerometer;
   at least one microphone;
   a processor; and
   memory having instructions which when executed by the processor causes the near-end headphone device to
      receive, from a far-end device, a downlink audio signal;
      drive the speaker with the downlink audio signal;
      receive a microphone signal from the microphone;
      receive an accelerometer signal from the accelerometer;
      echo cancel the accelerometer signal;
      residual echo suppress the echo cancelled accelerometer signal;
      generate a combined signal-to-noise ratio-residual echo suppression (SNR-RES) signal based on a SNR of the echo cancelled accelerometer signal and the residual echo suppression signal;
      determine whether the combined SNR-RES signal is below a threshold;
      in response to determining that the SNR-RES signal is below the threshold,
         gate the echo cancelled accelerometer signal;
         generate an uplink audio signal by blending the gated signal with the microphone signal; and
         transmit the uplink audio signal to the far-end device.

10. The near-end headphone device 9, wherein the instructions to gate the echo cancelled accelerometer signal comprises instructions to multiply the echo cancelled accelerometer signal with the residual echo suppression signal.

11. The near-end headphone device of claim 9, wherein the memory has further instructions which when executed cause the near-end headphone device to perform the acoustic echo cancellation upon the microphone signal to produce an echo cancelled microphone signal, wherein the instructions to blend comprise instructions to blend the gated signal with the echo cancelled microphone signal into the uplink audio signal.

12. The near-end headphone device of claim 11, wherein the instructions to generate the combined SNR-RES signal comprises instructions to determine 1) a first SNR signal from the echo cancelled accelerometer signal and 2) a second SNR signal from the echo cancelled microphone signal;

determine an estimated SNR signal based on the first and second SNR signals; and summing in logarithmic domain the estimated SNR signal and the residual echo suppression signal.

13. The near-end headphone device of claim 11, wherein the instructions to blend the gated signal with the echo cancelled microphone signal comprises instructions to add, for each of a first plurality of frequency bins below a frequency threshold, a corresponding frequency bin from at least one of the gated signal and the echo cancelled microphone signal; and adding, for each of a second plurality of frequency bins above the frequency threshold, corresponding frequency bins of the echo cancelled microphone signal into the uplink signal.

14. The near-end headphone device of claim 9 further comprises two or more microphones, wherein the microphone signal is either produced by 1) one microphone of the near-end headphone device or 2) a beamformer as a beamformer audio signal that is based on microphone signals that are produced by at least two of the two or more microphones.

15. The near-end headphone device of claim 9, wherein the sound is speech of a far-end user of the far-end device, wherein the microphone signal contains speech of a near-end user of the near-end device.

16. The near-end headphone device of claim 9, wherein the memory has further instructions to determine whether a presence of wind is detected proximate to the near-end headset device, wherein the instructions to receive the accelerometer signal, echo cancel the accelerometer signal, residual echo suppress, generate the combined SNR-RES signal, and determine whether the combined SNR-RES signal is below the threshold are in response to a detection of the presence of wind.

17. An article of manufacture comprising a machine-readable medium having instructions stored therein that when executed by a processor of a near-end headphone device obtain, from a far-end device, a downlink audio signal;

drive a speaker of the near-end headphone device with the downlink audio signal;

receive a microphone signal from at least one microphone of the near-end headphone device;

receiving an accelerometer signal from an accelerometer of the near-end headphone device;

echo cancel the accelerometer signal;

residual echo suppress the echo cancelled accelerometer signal;

generate a combined signal-to-noise ratio-residual echo suppression (SNR-RES) signal based on a SNR of the echo cancelled accelerometer signal and the residual echo suppression signal;

determine whether the combined SNR-RES signal is below a threshold;

in response to determining that the combined SNR-RES signal is below the threshold, gate the echo cancelled accelerometer signal;

generate an uplink audio signal by blending the gated signal with the microphone signal; and transmit the uplink audio signal to the far-end device.

18. The article of manufacture of claim 17, wherein the instructions to gate the echo cancelled accelerometer signal comprises instructions to multiple the echo cancelled accelerometer signal with the residual echo suppression signal.

19. The article of manufacture of claim 17, wherein the medium has further instructions which when executed perform acoustic echo cancellation upon the microphone signal to produce an echo cancelled microphone signal, wherein the instructions to blend comprise instructions to blend the gated signal with the echo cancelled microphone signal into the uplink audio signal.

20. The article of manufacture of claim 19, wherein the instructions to generate the combined SNR-RES signal comprises instructions to determine 1) a first SNR signal from the echo cancelled accelerometer signal and 2) a second SNR signal from the echo cancelled microphone signal;

determine an estimated SNR signal based on the first and second SNR signals; and sum in logarithmic domain the estimated SNR signal and the residual echo suppression signal.

21. The article of manufacture of claim 19, wherein the instructions to blend the gated signal with the echo cancelled microphone signal comprises instructions to add, for each of a first plurality of frequency bins below a frequency threshold, a corresponding frequency bin from at least one of the gated signal and the echo cancelled microphone signal into the uplink signal; and add, for each of a second plurality of frequency bins above the frequency threshold, corresponding frequency bins of the echo cancelled microphone signal into the uplink signal.

22. The article of manufacture of claim 17, wherein the memory has further instructions to determine whether a presence of wind is detected proximate to the near-end headphone device, wherein the instructions to receive the accelerometer signal, echo cancel the accelerometer signal, residual echo suppress, generate the combined SNR-RES signal, and determine whether the combined SNR-RES signal is below the threshold are in response to a detection of the presence of wind.

* * * * *